July 23, 1968 J. A. FALER 3,393,689
BOTTOM-DUMPING SLUDGE PANS
Filed Oct. 31, 1966 2 Sheets-Sheet 1
FIG. 1
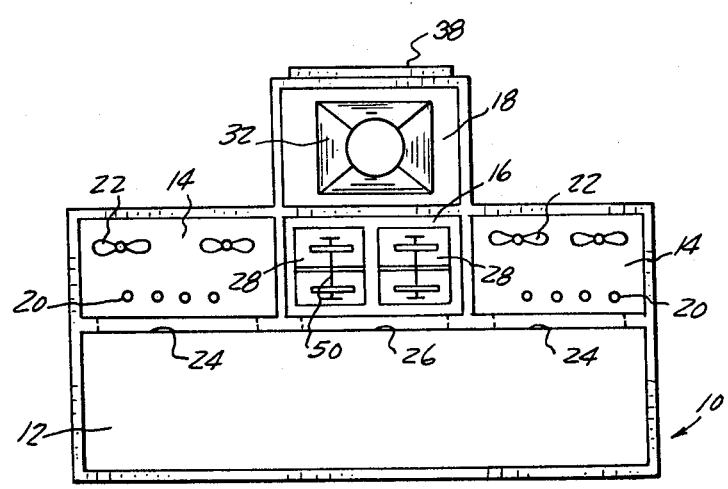
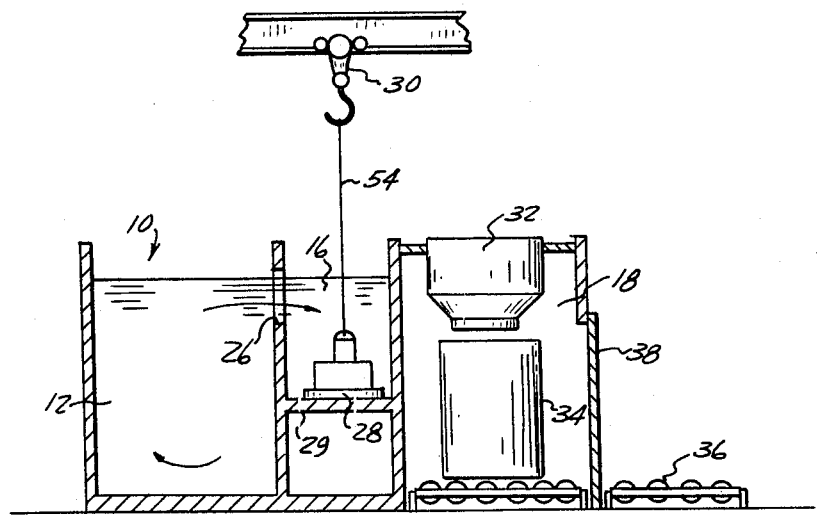
FIG. 2
INVENTOR
JOHN A. FALER
BY Cullen, Sloman, & Cantor
ATTORNEYS

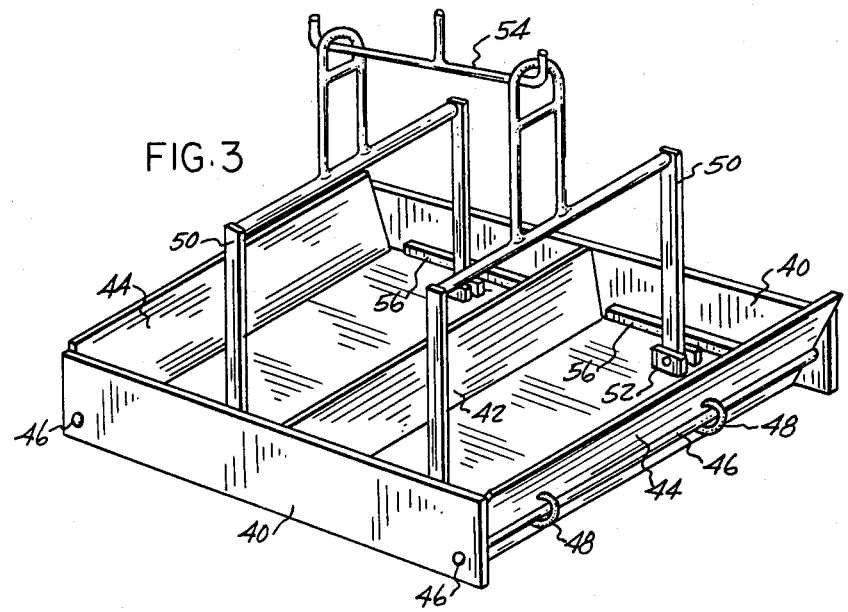
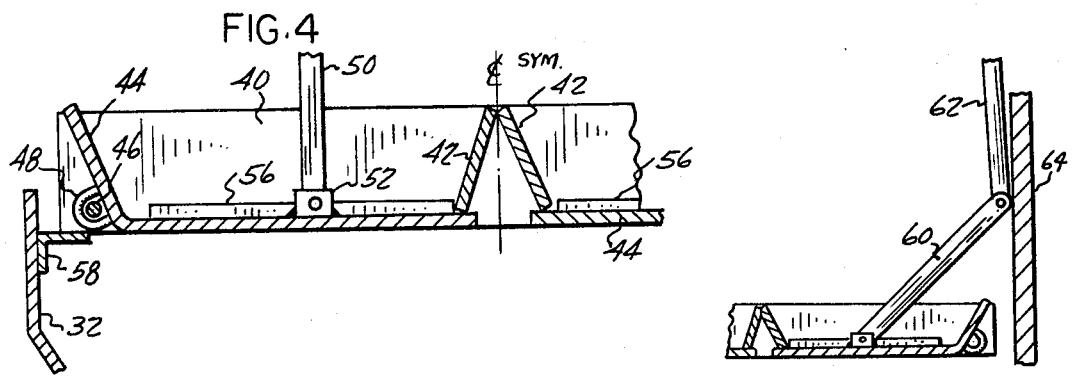
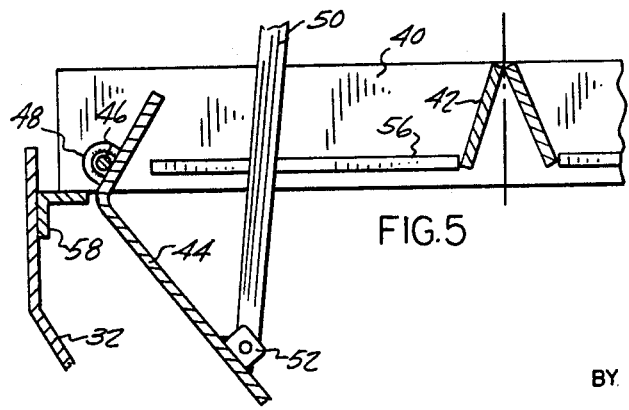

United States Patent Office 3,393,689
Patented July 23, 1968

---

3,393,689
BOTTOM-DUMPING SLUDGE PANS
John A. Faler, Livonia, Mich., assignor to Kolene Corporation, Detroit, Mich.
Filed Oct. 31, 1966, Ser. No. 590,756
3 Claims. (Cl. 134—104)

This invention relates generally to metal cleaning baths of the type utilizing high temperature molten chemicals, and more particularly to means for removing sludge from such baths.

In manufacturing and fabricating processes, it frequently becomes necessary to remove from metal surfaces various impurities such as scale, rust, paint and chemical films. Such metal cleaning is frequently accomplished by submerging the metal part in a molten chemical bath, such as a molten salt bath. During the operation of such a bath, the impurities removed from the metal gradually accumulate in the form of a mud-like sludge, which must be removed periodically to maintain the effectiveness of the bath.

Since a molten salt bath generally operates in the range of 900 degrees F., it becomes a considerable problem to safely remove this caustic sludge from the bath without shutting down the bath. Shutdown results in unwanted down time of the bath and loss of production. Removal of sludge from the bath introduces extreme safety hazards because of the high temperature involved and the danger of spattering.

Accordingly, it is an object of this invention to provide an improved means for removing sludge from a molten chemical bath while the bath is in operation.

It is another object of this invention to provide a means for removing sludge from a molten chemical bath whereby the entire process of removing the sludge and placing it in a container for disposal can be safely carried on with a minimum of risk to the operator.

These and other objects of this invention will become apparent from the following specification when considered in conjunction with the accompanying drawings.

In these drawings:

FIG. 1 is a top view of a chemical bath pot employing the sludge removal apparatus of this invention.

FIG. 2 is a cross-sectional side elevation of the pot of FIG. 1, viewed in the directions of arrows 2—2 of FIG. 1.

FIG. 3 is a perspective illustration of the bottom dumping sludge pan of this invention.

FIG. 4 is a fragmentary cross-sectional elevation of the sludge pan of FIG. 3 illustrated in the closed condition.

FIG. 5 is a view similar to FIG. 4, but showing the pan in the open position.

FIG. 6 is a fragmentary sectional view of a modified embodiment of the sludge pan shown within the sludge collecting zone.

Referring now to FIGS. 1 and 2 of the drawings in particular, the metal cleaning apparatus is in the form of a pot 10 which is adapted to be filled with a molten chemical such as salt. Pot 10 generally comprises a work zone 12 into which the parts to be cleaned would be submerged, heating zones 14 in which the molten salt is heated, a sludge collecting zone 16, and a sludge dumping chamber 18.

Heating zones 14 are provided with a plurality of heaters 20 and bath agitators 22, and communicate with work zone 12 of the pot by means of openings 24. The configuration of pot 10 and the location of agitators 22 establishes a predetermined pattern of molten salt circulation within the bath, to promote uniform heating of the bath and to create a quiescent zone in sludge collecting zone 16, whereby the sludge is permitted to settle toward the bottom of the pot only in selected locations. Such arrangements are more fully described, for example, in United States Patent Nos. 2,783,892 of March 5, 1957, and 2,863,465 of December 9, 1958.

Communication between work zone 12 and sludge collecting zone 16 is provided by means of an opening 26 at the surface of the molten bath. Within collecting zone 16 lie two sludge collecting pans 28, which may be fully supported by a panel 29 forming the bottom of the collecting zone. An overhead crane 30 provides the lifting and transporting means for removing pans 28 from the collecting zone 16 to the dumping chamber 18.

Within sludge dumping chamber 18 is mounted a hopper 32 which is spaced from the floor to allow a drum 34 to be positioned beneath it to receive sludge dumped from pans 28. A conveyor 36 may be provided so that drum 34 may be readily brought into and out of position beneath hopper 32. A vertically sliding door 38 is positioned in the wall of dumping chamber 18 so that the pumping operation can be safely carried on with a minimum of exposure and danger.

Referring now to FIGS. 3 and 4, in particular, each of pans 28 comprises a pair of side plates 40 joined together by transverse spacing plates 42. A pair of downwardly opening bottom doors 44 are pivotally mounted upon pivot bars 46 which pass through lugs 48 secured to doors 44 and are anchored in side plates 40. The position of the doors is controlled by a door linkage 50 which is pivotally secured to the upper face of the door by hinges 52. To lift pan 28, lifting bale 54 secured to crane 30 is adapted to engage the upper end of door linkage 50. Upward movement of doors 44 is limited by spacing plates 42 and by side stops 56 against which doors 44 abut as they reach the closed position illustrated in FIG. 4.

Doors 44 are generally L-shaped, so that they establish not only a bottom floor pan but also enclose the end portions of the pan. This conveniently eliminates a sealing problem which might otherwise exist between an otherwise fixed end wall and the pivoting bottom panel.

As can be seen from FIGS. 2 through 4, the bottom doors 44 of the sludge collecting pan may be maintained in the closed position in either of two ways. When the pan is fully supported from beneath, as is the case in FIG. 2, the bottom doors 44 are prevented from opening by their contact with the supporting panel 29 defining the bottom of collecting zone 16. Pans 28 are so configured and constructed that when the pan is lifted by means of bale 54 and linkage 50, the door is maintained closed and in abutting contact with spacing plates 42 and side stops 56. Thus, the pan forms a sealed container, when resting in the collecting zone 16 as well as when lifted therefrom.

To remove sludge from the bath, the pan is lifted and transported from collecting zone 16 into position over hopper 32 in sludge dumping chamber 18. As pan 28 is lowered toward hopper 32, it ultimately comes to rest on a pair of parallel support bars 58 bridging the upper opening of the hopper. Bars 58 are spaced apart to the extent that they engage the extreme ends of pan side plates 40, and thereby do not interfere with the downward swing of doors 44. Additional support for pan 28 may be provided in the form of a bar engaging the underside of spacing plates 42.

It can be seen from FIGS. 4 and 5 that once crane 30 has positioned pan 28 on support bars 58, continued lowering of bale 54 allows doors 44 to pivot downwardly from the now stationary pan. In this fashion, the load of sludge within the pan is automatically released from the pan and allowed to flow through hopper 32 into drum 34.

The illustrated embodiment utilizes two pans, so that one pan may remain in place while the other is being dumped.

An alternative embodiment of this invention, is illustrated in FIG. 6. This configuration would be utilized where the sludge collecting zone was located directly beneath the work zone of the bath, in contrast to the side sludge collecting zone illustrated in the embodiment of FIGS. 1 and 2. In such a configuration, it would be necessary to position the lifting linkage 50 so that it would not interfere with the work zone of the bath when the pan was in the sludge collecting position at the bottom of the bath.

Therefore, instead of the one piece linkage 50 in the embodiment of FIGS. 3 through 5, a two-piece linkage 60, 62 is provided to allow the linkage to lie along the side wall 64 of the pot where it cannot interfere with the workpiece receiving area.

This unique sludge dumping method and apparatus of this invention is a substantial improvement over the prior art techniques. Previously, it was necessary for a workman to overturn the sludge filled pan to remove the sludge or to shovel it from the pan into a disposal drum. Both methods were undesirable, either because of the great danger from handling the hot caustic sludge or because of the time lost in shutting down the bath.

This invention may be further developed within the scope of the following claims. Accordingly, the above description is to be interpreted as illustrative of only two operative embodiments of this invention, rather than in a strictly limited sense.

I now claim:

1. In a metal-cleaning bath of the type utilizing high temperature molten chemicals, and having a sludge collecting zone forming a portion of the bath, improved means for removing sludge from the bath, comprising:
   a sludge dumping zone including a hopper located adjacent said bath and settling zone;
   a sludge collecting pan normally submerged in the bath within the sludge collecting zone, said collecting pan comprising upwardly directed peripheral wall portions for retaining sludge within the pan and hinged bottom panel means adapted to pivot downwardly relative to the pan to dump the contents thereof, said pan further provided with stop means for preventing said bottom panel means from pivoting upwardly from its pan-closing position, and pan suspending means secured to the upper face of said bottom panel means by which said pan may be fully supported in balanced position from above;
   pan transporting means adapted to engage said pan suspending means from above to lift said pan from the bath and transport it to said hopper;
   said hopper having pan supporting means for engaging and supporting said pan from below, in such condition said pan supporting means being out of engagement with said bottom panel means;
   said collecting pan being fully supported from below when submerged in the sludge collecting zone, so that said bottom panel means is restrained from opening downwardly when in its sludge collecting position;
   whereby said collecting pan remains closed except when placed on said hopper by said transporting means, the release of lifting force from above allowing said bottom panel means to pivot downwardly to dump the contents of said pan into said hopper.

2. The sludge removal means of claim 1, wherein said bottom panel means comprises a pair of downwardly opening doors hinged at opposite ends, and wherein said pan suspending means comprises a pair of links extending upwardly from each of said doors and adapted to be engaged by said pan transporting means.

3. The sludge removal means of claim 1, wherein said bottom panel means comprises a generally L-shaped panel, the bottom of the pan being the long leg of the L, and the short leg of the L comprising an upwardly extending portion along the outer end of the pan bottom enclosing the pan and forming an integral end wall.

References Cited

UNITED STATES PATENTS

| | | | |
|---|---|---|---|
| 1,826,015 | 10/1931 | Morton | 134—104 XR |
| 2,139,096 | 12/1938 | Piquerez. | |
| 3,005,568 | 10/1961 | Clune et al. | 214—307 XR |

ROBERT L. BLEUTGE, *Primary Examiner.*